United States Patent
Stessen et al.

(10) Patent No.: US 6,700,626 B2
(45) Date of Patent: Mar. 2, 2004

(54) VIDEO-APPARATUS WITH PEAKING FILTER

(75) Inventors: Jeroen Hubert Christoffel Jacobus Stessen, Eindhoven (NL); Christian Hentschel, Eindhoven (NL); Michel Wouter Nieuwenhuizen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 428 days.

(21) Appl. No.: 09/809,513

(22) Filed: Mar. 15, 2001

(65) Prior Publication Data

US 2002/0027618 A1 Mar. 7, 2002

(30) Foreign Application Priority Data

Mar. 15, 2000 (EP) .............................. 00200940

(51) Int. Cl.$^7$ ................................. H04N 5/21
(52) U.S. Cl. ................ 348/627; 358/463; 358/532; 382/263; 382/266
(58) Field of Search ................. 348/625, 627; 358/447, 463, 532; 382/263, 264, 266, 254, 275; H04N 5/21

(56) References Cited

U.S. PATENT DOCUMENTS

| | | | | |
|---|---|---|---|---|
| 3,839,598 A | * | 10/1974 | Okada et al. ............... | 348/625 |
| 3,938,050 A | * | 2/1976 | Corbett et al. ............. | 327/317 |
| 3,946,153 A | * | 3/1976 | Peth et al. .................. | 348/625 |
| 4,263,616 A | * | 4/1981 | Lee ............................ | 348/627 |
| 4,414,564 A | * | 11/1983 | Hitchcock .................. | 348/625 |
| 4,616,252 A | * | 10/1986 | Schiff ........................ | 348/639 |
| 4,667,304 A | * | 5/1987 | Hier et al. .................. | 708/819 |
| 5,196,736 A | * | 3/1993 | Doornhein et al. ......... | 327/170 |
| 5,204,747 A | * | 4/1993 | Shinkai ...................... | 348/625 |
| 5,321,511 A | * | 6/1994 | Min ........................... | 348/625 |
| 5,517,247 A | * | 5/1996 | Correa et al. ............... | 348/448 |
| 5,790,205 A | * | 8/1998 | Pettitt et al. ................ | 348/629 |
| 6,008,862 A | * | 12/1999 | Bellers ....................... | 348/631 |
| 6,094,205 A | * | 7/2000 | Jaspers ....................... | 348/625 |
| 6,278,494 B1 | * | 8/2001 | Kanai et al. ................ | 348/625 |
| 6,570,673 B2 | * | 5/2003 | Kishimoto .................. | 358/1.2 |

FOREIGN PATENT DOCUMENTS

| | | |
|---|---|---|
| EP | 0479483 B1 | 4/1992 |
| EP | 0651577 A2 | 5/1995 |
| EP | 0677958 A2 | 10/1995 |
| EP | 0805603 A1 | 11/1997 |
| WO | WO9809443 | 3/1998 |

OTHER PUBLICATIONS

Philips Semiconductors product specification SAA4978H, May 03, 1999 Picture Improved Combined Network (PIC-NIC), pp. 14–15.

Christian Hentschel; "Video–Signalverarbeitung" B.G. Teubner, Stuttgart 1998. pp138–142. (no translation provided).

* cited by examiner

*Primary Examiner*—John Miller
*Assistant Examiner*—Brian Yenke

(57) ABSTRACT

A video-apparatus includes a peaking filter (3-5), which, in response to applied video signals, supplies peaking signals (Vp) that are combined with the applied video signals. The peaking filter (3-5) includes a first (3) and a second (4) 1$^{st}$-first order high-pass or band-pass filter in cascade configuration, while a unit (5, 6) for determining the peaking strength is arranged between the first (3) and second (4) filters.

4 Claims, 2 Drawing Sheets

VIDEO-APPARATUS WITH PEAKING FILTER

BACKGROUND OF THE INVENTION

1. Field of the Invention

The present invention relates to a video apparatus comprising video signal supplying means and a peaking filter, which, in response to applied video signals, supplies output signals which are combined with the respective applied video signals, the peaking filter including a high-pass or band-pass filter and means for determining the peaking strength.

2. Description of the Related Art

The article "Video-Signalverarbeitung", Christian Hentschel, B. G. Teubner, Stuttgart 1998, describes a video apparatus with a peaking filter.

A peaking algorithm performs edge enhancement. This means that the steepness of an edge in a video image is measured and then the steepness may be increased by means of a peaking signal. Edge enhancement depending on the steepness of the edge, is called dynamic peaking.

The traditional implementation of peaking is to apply a $2^{nd}$-order high-pass or band-pass filter to the video signal. If the output signal of, e.g., a $2^{nd}$-order high-pass filter with an impulse response of ( . . . , 0, −0.25, +0.5, −0.25, 0, . . . ) is added to a video signal, this is equivalent to filtering using a filter with filter coefficients (−0.25, +1.50, −0.25). The step response of the $2^{nd}$-order high-pass filter results in a symmetrical peaking. Obviously, the step response of this filter has −25% undershoot and +25% overshoot. To avoid overflow, the amount of added peaking must sometimes be limited.

In order to determine the peaking strength, International Patent Application No. WO-A-98/09943, corresponding to U.S. Pat. No. 6,094,205, discloses adding, in parallel to the $2^{nd}$-order filter, a $1^{st}$ order filter to measure the steepness of edges of video-images, followed by means for determining a gain factor, which, multiplied with the output signal of the $2^{nd}$-order filter, supplies peaking strength signals. To perform edge enhancement, these peaking strength signals are combined with the respective video signals. In order to simplify the peaking filter in WO-A-98/09943, Hentschel (see the above reference) proposes to obtain peaking strength signals by means of a look-up table (LUT) which contains peaking strength values according to a non-linear function based on the contour signals from the $2^{nd}$-order filter.

Although a $2^{nd}$-order filter with filter coefficients (−1, +2, −1)/2 may be used, such a high-pass filter is not the best choice. It has a maximum gain at a frequency ½*$f_s$ ($f_s$ being the sample frequency), where there is guaranteed to be no more video information but only noise. Also, the perception of sharpness enhancement at such high video frequencies is not strong. It is better to use a band-pass filter, like (−1, 0, +2, 0, −1)/4. This filter has a maximum gain at ¼*$f_s$, where there is a lot more video information. The sensitivity of the eye to that frequency is much higher. This filter has zero gain at ½*$f_s$, where there is only noise. At least that noise will not be enhanced.

SUMMARY OF THE INVENTION

It is, inter alia, an object of the invention to provide an improved peaking. To this end, according to an aspect of the invention, the video apparatus as described in the opening paragraph, comprises a first and a second $1^{st}$-order high-pass or band-pass filter in cascade configuration, and means for determining a peaking strength arranged between said first and second $1^{st}$-order filters. In a particularly simple embodiment, the first $1^{st}$-order filter and/or the second $1^{st}$-order filter is provided with filter coefficients (−1, +1) or (−1, 0, +1). The frequency response of such a peaking filter, which operates twice on 2 pixels, corresponds with that of a Hentschel $2^{nd}$-order filter operating on 3 pixels.

As the steepness of an edge is measured in the first $1^{st}$ order filter, it may be sufficient to form the means for determining the peaking strength as a lookup-table (LUT) between the first and second $1^{st}$-order filters. In the Hentschel $2^{nd}$-order filter, the peaking strength is determined based on contour signals, while, in the filter according to the invention, the peaking strength is dependent on the slope of the edges. The $1^{st}$-order differentiator then acts to distribute the edge enhancement over the two pixels before and after the edge. Given the height of an original edge, the peaking strength, based on the first $1^{st}$-order differentiator, provides accurately how much the height will be modified.

Soft edges may be due to noise and would not be enhanced, while hard edges are already steep. Hence, the emphasis should be on enhancing only edges with medium steepness. For this reason, the look-up table (LUT) comprises peaking values which are small for small-slope steepness and for large-slope steepness, and large for medium-slope steepness.

The peaking implementation according to the invention has the following advantages: The modification of the edge height or slope is precise; there is a good trade-off between edge enhancement and noise amplification; and anti-peaking (a negative entry in the look-up table) can be used for spatial noise reduction. In these aspects, the peaking filter according to the invention is distinguished from the Hentschel peaking filter.

These and other aspects of the invention will be apparent from and elucidated with reference to the embodiments described hereinafter.

DESCRIPTION OF THE PREFERRED EMBODIMENTS

Figure 1:
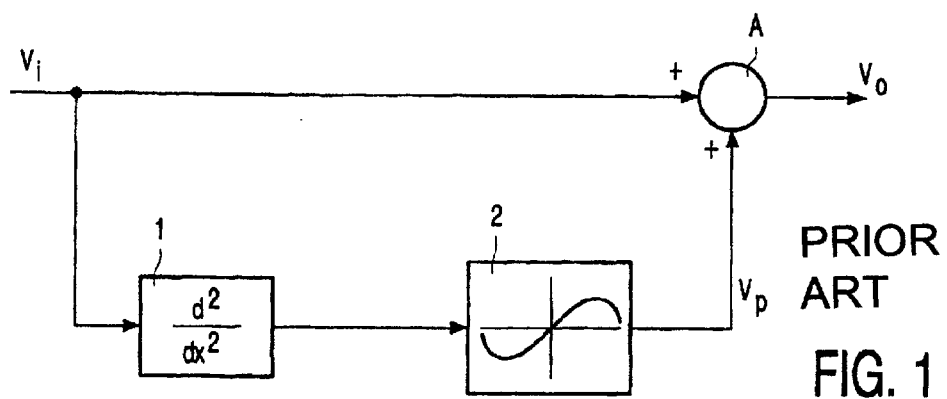
FIG. 1 is a basis block diagram of a peaking algorithm according to the state of the art.

The basis block diagram of FIG. 1 shows a peaking filter according to the state of the art (a Hentschel filter). The peaking filter comprises a $2^{nd}$-order band-pass filter 1, functioning as a contour filter, with filter coefficients (−1, 0, +2, 0, −1). A $2^{nd}$-order filter is used because this is the simplest form of an even-order, and thus symmetrical, filter. This filter generates a peaking signal Vp in response to an input video signal Vi and, after multiplication by a factor k, is added, in adder A, to the input signal Vi thereby forming a peak enhanced output signal Vo. The peaking strength, i.e., the multiplication by the factor k, is determined in a look-up table (LUT) 2. The look-up table 2 is based on contour measurements.

Figure 2:
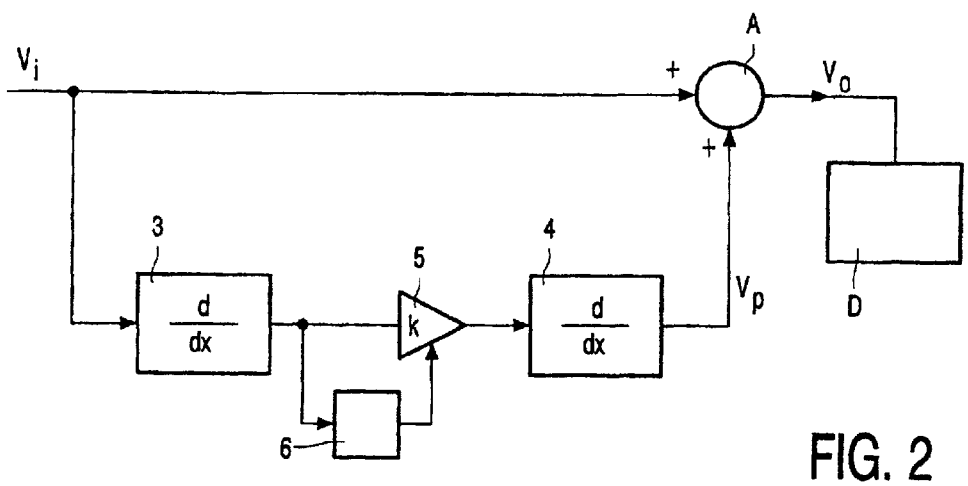
FIG. 2 is a basis block diagram of an embodiment of a video display apparatus comprising a peaking device according to the invention.

The invention replaces the prior art $2^{nd}$-order filter with two $1^{st}$-order filters, incorporated into the peaking filter itself. This is illustrated in FIG. 2. The peaking filter in this embodiment comprises two $1^{st}$-order band-pass filters 3 and 4, separated by an amplifier 5. The adjustment of the amplification factor k of the amplifier 5 occurs on the basis of the measurement of the steepness of edges of video-images, i.e., by the output signals of filter 3. These output signals are supplied to a steepness determining unit 6 by which the adjustment signal for the amplifier 5 is derived. The output signal Vo of the peaking device 3-6, A is applied to a display device D. As the input signal of the amplifier 5 is the same as the input signal of the steepness determining unit 6, both can be combined in a look-up table (LUT). This embodiment is illustrated in FIG. 3.

Figure 3:
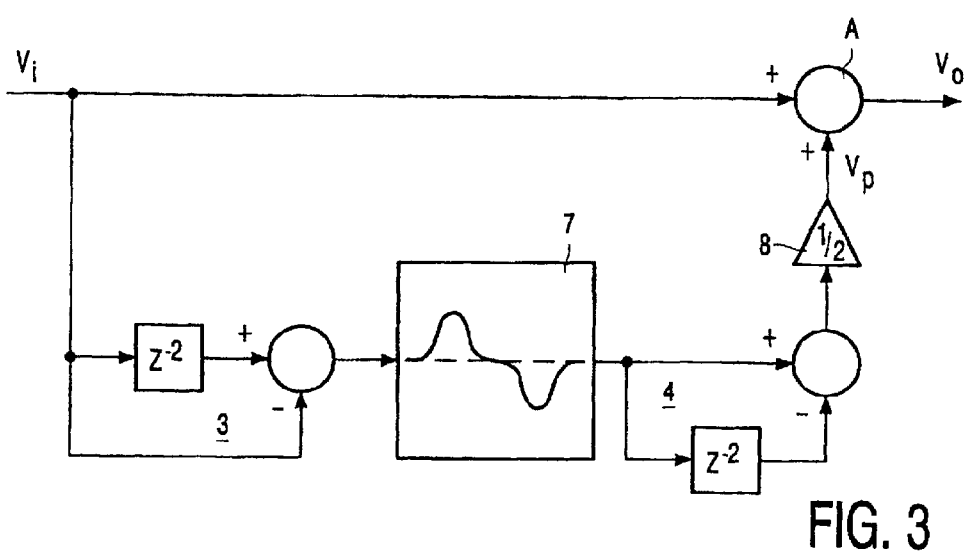
FIG. 3 is a more detailed block diagram of a preferred embodiment of the peaking algorithm according to the invention.

FIG. 3 shows an embodiment of the filters 3 and 4 in cascade configuration, separated by a LUT 7 and a scale correction unit 8 after the second filter 4. The filters 3 and 4 have filter coefficients (−1, 0, +1)/2. The cascade configuration of these filters results in a $2^{nd}$-order filter with filter coefficients (−1, 0, +2, 0, −1)/4, provided that k is negative for positive LUT input signals, and positive for negative LUT input signals. The transfer function of the peaking filter in combination with the input video signal can be represented by:

$$H_k(z) = 1 + k * \left[ \frac{-z^{+2} + 2 - z^{-2}}{4} \right],$$

this transfer function having the same frequency response as the application of the transfer function of the $2^{nd}$-order filter of FIG. 1.

As already mentioned, the peaking strength is determined in the LUT 7. The peaking values therein are such that the peaking strength is large for medium-slope steepness. For small-slope steepnesses, the peaking strength is small; by this measure, amplification of spatial noise is prevented. Also for large-slope steepnesses, the peaking strength is zero; by this measure, unnecessary clipping of the signal is prevented, while aliasing artefacts are reduced. For these reasons, the LUT 7 contains peaking values according to the graphic in the LUT 7 in FIG. 3. In the LUT 7, the effect of noise coring is taken into account.

If, e.g., the video input signal is an 8-bit signal, the output signal of filter 3 is a 9-bit signed signal. The LUT 7 provides, in response to this 9-bit signed signal, an 8-bit signed signal, which, again in the filter 4, is transferred into a 9-bit signed signal. For this reason, the scale correction unit 8 in this example is formed by a 2-divider to obtain an 8-bit signed signal which is combined with a respective 8-bit unsigned video input signal. In this example, the peaking strength is quantized twice, i.e., once implicitly in the LUT 7 and once explicitly in the scale correction unit 8. However, many other possibilities for quantization may be realized.

Figure 4:
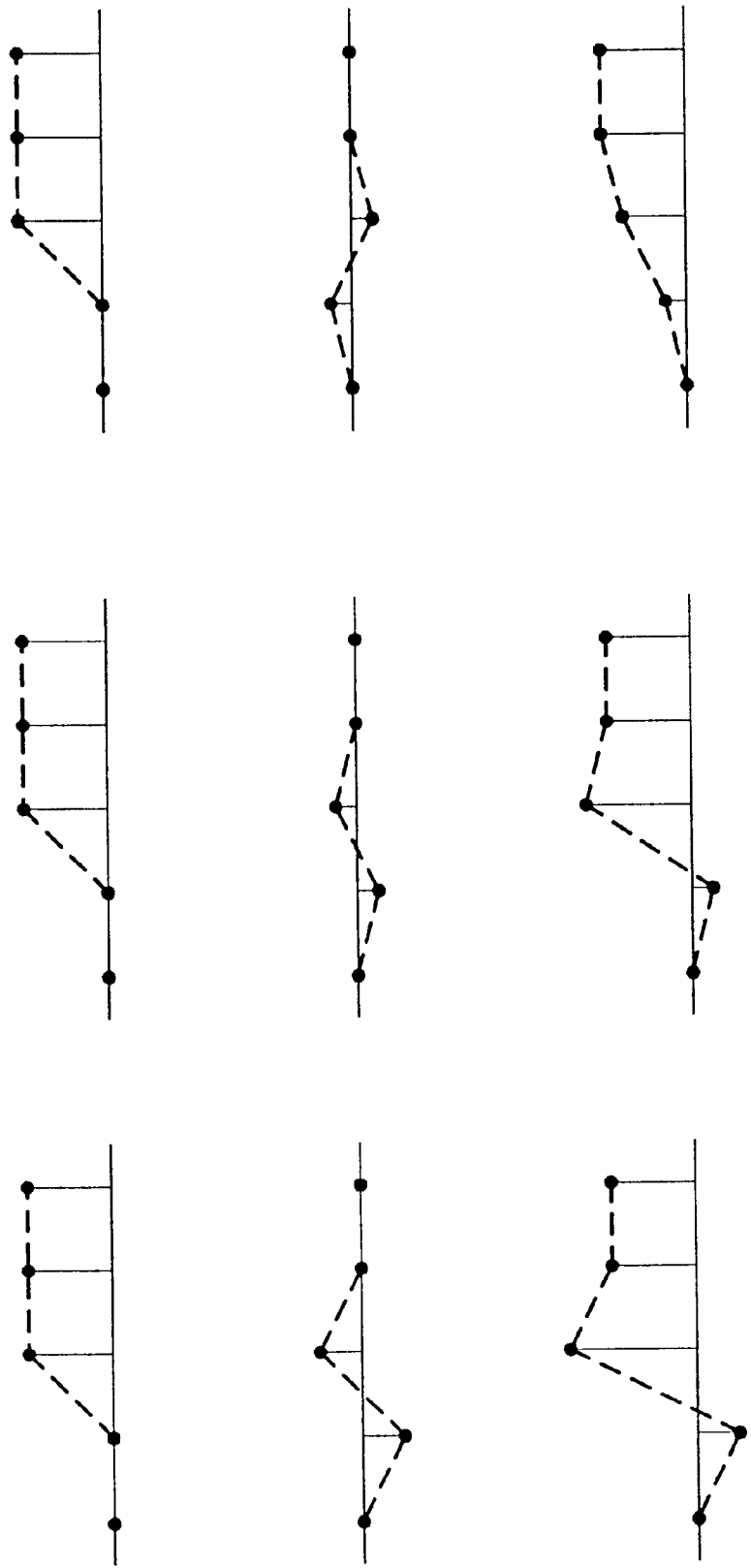
FIG. 4 shows some diagrams to illustrate the effect of strong, weak and negative peaking (noise reduction).

FIG. 4 shows some diagrams to illustrate the effect of strong, weak and negative peaking (noise reduction). In the first column in this figure, a step input function is shown, followed by a strong peaking signal, obtained in the peaking filter of FIG. 3, and the resulting enhanced-edge output signal. With a weaker peaking, the second column shows again the step input function, a weaker peaking signal and the obtained enhanced-edge output signal. In both cases, the peaking signal is added to the video input signal. It is, however, possible to subtract the peaking signal from the video input signal. This is called negative peaking and implies noise reduction, i.e., instead of a more enhanced edge, a smoother edge is obtained. In the third column of FIG. 4, again the step input function is indicated, now followed by a negative peaking signal and smoothed-edge output signal. In the first two cases, the combination of the video input signal and the peaking signal is an adding operation, while in the third case, this combination is a subtracting operation.

When, in case of 2D peaking in each direction, horizontally and vertically, $1^{st}$-order differences are calculated for determining the peaking strength by means of filters with coefficients (−1, 0, +1), for horizontal peaking, $z^{-2}$ represents a 2-pixel delay, for vertical peaking, $z^{-2}$ represents a 2-lines delay in a frame, equivalent to a 1-line delay in a field. In this case of 2D peaking, there are two peaking algorithms, i.e., one for vertical peaking and one for horizontal peaking. All algorithms use (−1, 0, +1) filters. For each line, vertical and horizontal peaking have to be done. The vertical peaking algorithm needs access to 2 successive input lines in the same field (because of the $z^{-2}$ block). The horizontal peaking algorithm works intra-line.

There are two possibilities for cascading these two algorithms (without a field memory in between):

(a) first vertical and then horizontal peaking; in this situation, the vertical peaking function can simply read 2 lines from the same input field buffer and pass one line buffer to the horizontal peaking function; and (b) first horizontal and then vertical peaking; in this situation, horizontal peaking must pass 2 line buffers (last and previous) to the vertical peaking function.

The embodiment described above is realized by an algorithm, at least part of which may be in the form of a computer program capable of running on signal processing means in a video-apparatus. In so far part of the figures show units to perform certain programmable functions, these units must be considered as sub-parts of the computer program. Particularly, the look-up tables can be realized by part of the computer's memory.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

What is claimed is:

1. A peaking device, comprising:

a peaking filter for supplying peaking signals in response to applied video signals, the peaking filter including a first and a second $1^{st}$-order high-pass or band-pass filter in cascade configuration, and means for determining a peaking strength arranged between said first and second filters; and means for combining the peaking signals with the applied video signals to obtain output peaked video signals, wherein, in a range of possible slope values in said applied video signal, said determining means provides more peaking for slope values in the middle of said range than for slope values in said range which are smaller than or exceeding said middle slope values.

2. A peaking device, comprising:

a peaking filter for supplying peaking signals in response to applied video signals), the peaking filter including a first and a second $1^{st}$-order high-pass or band-pass filter in cascade configuration, and means for determining a peaking strength arranged between said first and second filters; and means for combining the peaking signals with the applied video signals to obtain output peaked video signals, characterized in that the first and/or the second $1^{st}$-order filter is provided with filter coefficients (−1, +1) or (−1, 0, +1).

3. The peaking device as claimed in claim 1, characterized in that the means for determining the peaking strength comprises a look-up table.

4. A peaking method, comprising the steps of:

subjecting applied video signals to a first $1^{st}$-order high-pass or band-pass filter to obtain differentiated signals;

determining a peaking strength in dependence upon the differentiated signals, to produce adjusted differentiated signals;

subjecting the adjusted differentiated signals to a second $1^{st}$-order high-pass or band-pass filter to obtain peaking signals; and combining the peaking signals with the applied video signals, wherein, in a range of possible slope values in said applied video signal, said determining step provides more peaking for slope values in the middle of said range than for slope values in said range which are smaller than or exceeding said middle slope values.

* * * * *